United States Patent
Murg

(10) Patent No.: US 7,407,136 B2
(45) Date of Patent: Aug. 5, 2008

(54) STATIC PORT SKIN APPLIQUE APPARATUS AND METHOD

(75) Inventor: Larry J. Murg, Aurora, OH (US)

(73) Assignee: Aerocontrolex Group, Inc., Cleveland, OH (US)

( * ) Notice: Subject to any disclaimer, the term of this patent is extended or adjusted under 35 U.S.C. 154(b) by 177 days.

(21) Appl. No.: 11/065,293

(22) Filed: Feb. 25, 2005

(65) Prior Publication Data

US 2006/0022082 A1      Feb. 2, 2006

Related U.S. Application Data

(60) Provisional application No. 60/547,806, filed on Feb. 27, 2004.

(51) Int. Cl.
*B64D 43/00* (2006.01)

(52) U.S. Cl. ............... 244/129.1; 244/1 R; 73/182

(58) Field of Classification Search ............... 244/130, 244/132, 133, 119, 129.1, 129.4, 121, 1 R; 73/181, 182
See application file for complete search history.

(56) References Cited

U.S. PATENT DOCUMENTS

| | | | | |
|---|---|---|---|---|
| 3,262,316 A | * | 7/1966 | Hansen et al. | 73/700 |
| 3,612,439 A | | 10/1971 | Wingham | 244/1 R |
| 5,014,934 A | * | 5/1991 | McClaflin | 244/132 |
| 5,588,616 A | * | 12/1996 | Perkins | 244/1 R |
| 5,601,254 A | * | 2/1997 | Ortiz et al. | 244/1 R |
| 5,616,861 A | * | 4/1997 | Hagen | 73/180 |
| 5,657,946 A | * | 8/1997 | Perkins | 244/1 R |
| 6,443,390 B2 | * | 9/2002 | Bourgon et al. | 244/1 R |
| 6,550,344 B2 | * | 4/2003 | Bachinski et al. | 73/861.05 |
| 6,813,942 B1 | * | 11/2004 | Vozhdaev et al. | 73/170.02 |
| 6,915,987 B2 | * | 7/2005 | Fisher et al. | 244/129.3 |
| 2005/0230547 A1 | * | 10/2005 | Giamati et al. | 244/129.1 |

FOREIGN PATENT DOCUMENTS

| | | |
|---|---|---|
| EP | 0 716 307 | 6/1996 |
| EP | 1 082 616 | 3/2001 |
| EP | 1 145 952 | 10/2001 |

* cited by examiner

*Primary Examiner*—Benjamin P Lee
(74) *Attorney, Agent, or Firm*—Baker & Hostetler LLP

(57) ABSTRACT

A surface-mounted fuselage skin appliqué panel having an aperture to a reference static air input port is rugged, replaceable, and independently calibratable. The static port skin appliqué generally conforms to the fuselage surface, and is held in place either with adhesive or with a mounting frame. The appliqué size enables airflow in the vicinity of the static port to be substantially uniform. Because the appliqué is not part of the fuselage structure, distorting stress loads are avoided. The appliqué material resists scratches and bumps that can distort flow. A static port skin appliqué and its mounting provisions can be made using a range of materials, and can receive finishes to meet user preferences.

20 Claims, 4 Drawing Sheets

STATIC PORT SKIN APPLIQUE APPARATUS AND METHOD

CLAIM OF PRIORITY

This application claims priority to U.S. Provisional Application No. 60/547,806, filed Feb. 27, 2004, by Larry J. Murg, entitled, "STATIC PORT SKIN", which is hereby incorporated by reference in its entirety.

FIELD OF THE INVENTION

The present invention relates generally to airborne static port references. More particularly, the present invention relates to an apparatus and method for providing highly smoothed aircraft skin surface for low-turbulence flow in the vicinity of a static air inlet port used as a pressure reference in measuring altitude, speed, rate of climb, and other flight parameters.

BACKGROUND OF THE INVENTION

A relatively small region of an aircraft fuselage surface, commonly located near the cockpit, is used as a reference surface for many flight dynamic measurement functions. The region needs a smooth and stable contour, so that reference pressure detection remains consistent from flight to flight. In order to allow relatively static reference air to couple via a static port to altimeters and other flight instruments, the fuselage region is commonly pierced with one or more holes, which can stress the skin material. Riveting and other fastening methods likewise apply stresses. As a consequence of such stress loading, the region has a tendency to deform as flight flexure, pressurization cycling, and thermal changes allow relief of stress. Even scratches and bumps from contact with equipment such as gangways and air stairs can appreciably affect flow, while calibration, both periodic and after even minor distortion, is often time consuming and costly.

Repairs to the region of the static port can involve replacing surface panels, labor-intensive shimming, and application, smoothing, and finishing of filler material ("Bondo®" or comparable surface filling products from various vendors). Known prevention methods include installing at the location of the static port a recessed well into which a panel is fitted that substantially takes the shape of the unmodified surface. Such methods are likewise generally costly and labor intensive.

Accordingly, there is a need in the art for providing a simplified static port skin appliqué fitting that assures smooth, stable, repeatable airflow over a fuselage surface proximal to a static port, maintains a specific surface contour, allows calibration of the appliqué separate from the aircraft, and permits ready removal and replacement of the appliqué. There is a further need for improved durability compared to an ordinary skin surface of the aircraft.

SUMMARY OF THE INVENTION

Preferred embodiments of the invention provide a static port skin appliqué that closely overlays and conforms to an aircraft's existing exterior surface at the location where installed, surrounded by a faired retention mount that permits ready removal and replacement.

In a first aspect, a static port skin appliqué for an aircraft measurement reference is presented. The static port skin appliqué includes a panel generally conformal to a fuselage surface at a location, a retainer, whereby the panel is held closely against the fuselage surface at the location, and an aperture in the panel, whereby pressure from surrounding air couples to a corresponding aperture in a static port inboard of the panel.

In another aspect, a method for providing a static port skin appliqué for an aircraft measurement reference is presented. The method includes developing a surface contour for an aircraft fuselage over a region of the fuselage, wherein the region includes a static port, defining a shape for a panel, whereby an inboard surface of the panel substantially conforms to the developed surface contour over the region, further defining a shape for a panel, whereby an outboard surface of the panel is at least one of closely duplicating the surface contour of the fuselage over the region, providing a surface substantially parallel to an inboard surface of the panel proximal to the static port, providing a panel edge profile compatible with retention of the panel in a mounting frame, and providing a surface contour having a gradual transition from a thin edge region to a central region wherein the panel provides a contour compatible with the static port, and further defining a shape for a panel, whereby a planar projection of the panel includes at least one of having at least one rectilinear side edge, having non-radiused corners, having radiused corners, and having a perimeter at least in part substantially continuously curved.

In yet another aspect, a static port skin appliqué for an aircraft measurement reference is presented. The static port skin appliqué includes means for developing a surface contour for an aircraft fuselage over a region of the fuselage, wherein the region includes a static port, means for defining a shape for a panel, wherein an inboard surface of the panel substantially conforms to the developed surface contour over the region, means for further defining a shape for a panel, wherein an outboard surface of the panel is at least one of closely duplicating the surface contour of the fuselage over the region, providing a surface substantially parallel to an inboard surface of the panel proximal to the static port, closely duplicating the surface contour of the fuselage over the region with an exception of an edge profile compatible with retention of the panel in a mounting frame, and providing a surface contour having a gradual transition from a thin edge region to a central region wherein the panel provides a contour compatible with the static port, and means for further defining a shape for a panel, wherein a planar projection of the panel includes at least one of having at least one rectilinear side edge, having non-radiused corners, having radiused corners, and having a perimeter at least in part substantially continuously curved.

There have thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments, and of being practiced and carried out in various ways. It is also to be understood that the phraseology and terminology employed herein, as well as the abstract, are for the purpose of description, and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A preferred embodiment of the invention provides a durable static port skin appliqué that functions as a replaceable overlay to the aircraft skin. The static port skin appliqué is less subject to distortion from flight and ground stresses, while remaining readily replaceable.

Figure 1:
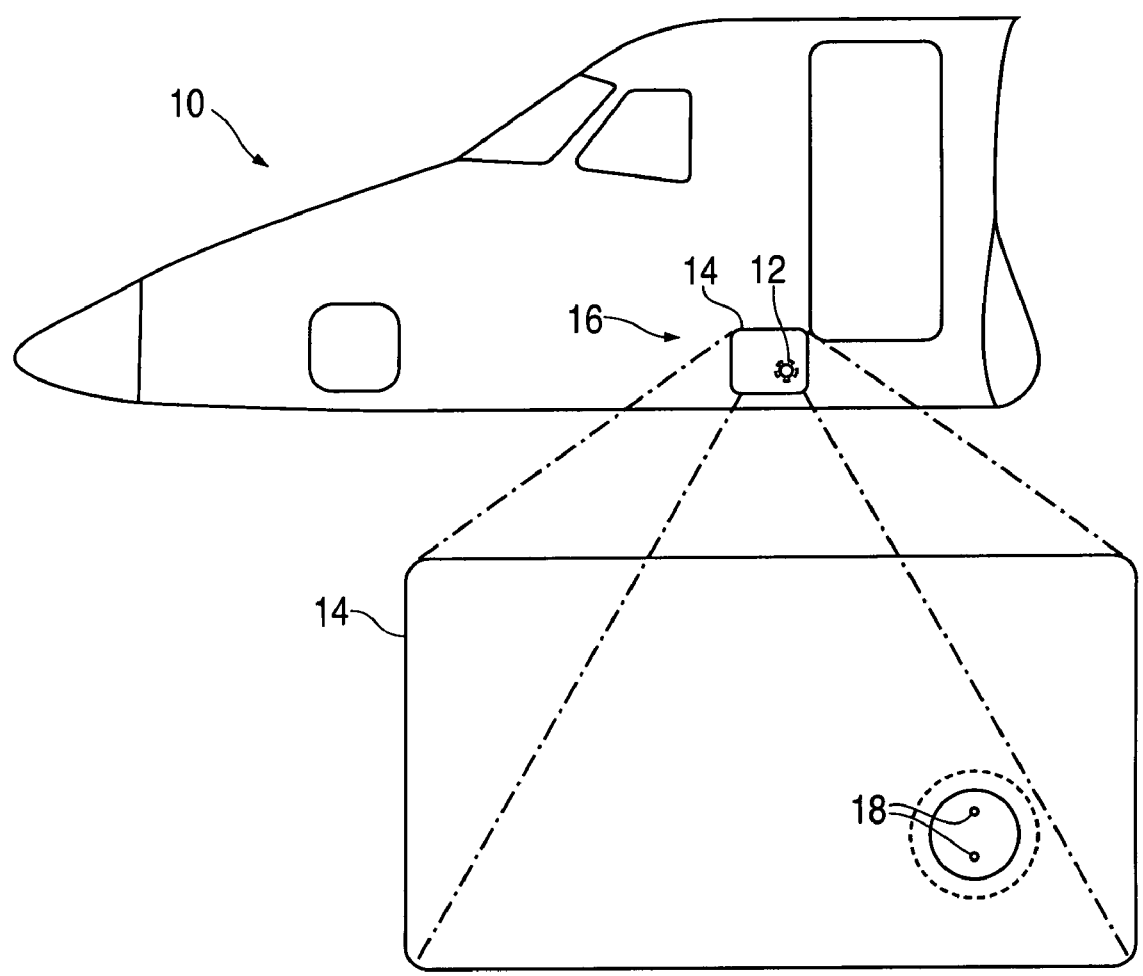
FIG. 1 is a perspective view of a fuselage component with a static port skin appliqué in place.

FIG. 1 shows a portion of an aircraft fuselage 10 including a static port 12 with the static port 12 shielded by a protective appliqué 14 over the fuselage skin 16. The fuselage skin 16 proximal to the static port 12, like the remaining skin on an aircraft, is commonly an ordinary section of aluminum, fiber reinforced composite, or other flight structural material attached by rivets, welding, or adhesives to an underlying structure such as a grid of frames and stringers. If a protective appliqué 14 is not used on the aircraft, the material of the fuselage skin 16 is typically either pierced with a hole pattern 18 to couple air pressure from the immediate region to the static port 12, or provided with a passthrough hole to position the static port 12 substantially flush with the surface. Either of these provisions, or a similar accommodation, allows the static port 12 to provides a reference pressure for measurement functions such as airspeed, altitude, and the like. The material of the skin 16 is subject to distortion in use, so that the surface shape can accumulate flow anomalies and introduce measurement error. Management of such error commonly requires periodic visual inspection, test, adjustment of instrument calibration, polishing or refinishing of skin surfaces, or removal and replacement of skin sections, the last followed by further testing and calibration.

A skin appliqué 14 as shown in FIG. 1 overlays the fuselage skin 16 in the vicinity of the static port 12 and extends the hole pattern 18 of the static port 12 to the surface. The appliqué 14, not being integral with the stressed structure of the skin 16, is intrinsically less likely to become distorted from normal flight events. Further, the appliqué 14, installed at a relatively small location and thus light in weight, can be made from a material that is stronger, harder, thicker, or otherwise more robust than fuselage skin 16 without appreciably degrading aircraft performance.

Airflow over a static port 12 with an appliqué 14 installed can be made minimally different from flow over a surface without the appliqué 14 by replicating surface contour and finish of the fuselage skin 16 and by providing a transition region with appropriate characteristics. Any remaining difference between static port 12 performance before and after installation of an appliqué 14 can in most instances be accommodated by a necessary initial calibration. As an aircraft in service continues to be used, change of the surface over the static port 12 after appliqué 14 installation is reduced compared to such change in an unmodified aircraft, because the appliqué 14, which may be stronger than the fuselage skin 16 and may not be experiencing significant structural loads, substantially retains its initial shape.

Impact and scratch events and other causes of flow distortion can be reduced in effect by the added strength and toughness provided by the presence of the appliqué 14, while removal and replacement of the appliqué 14 alone can correct damage that does occur. If the appliqué 14 is certified as a calibrated reference surface, then static port calibration at the aircraft level may be unnecessary following replacement of an appliqué 14 by an installer.

Figure 2:
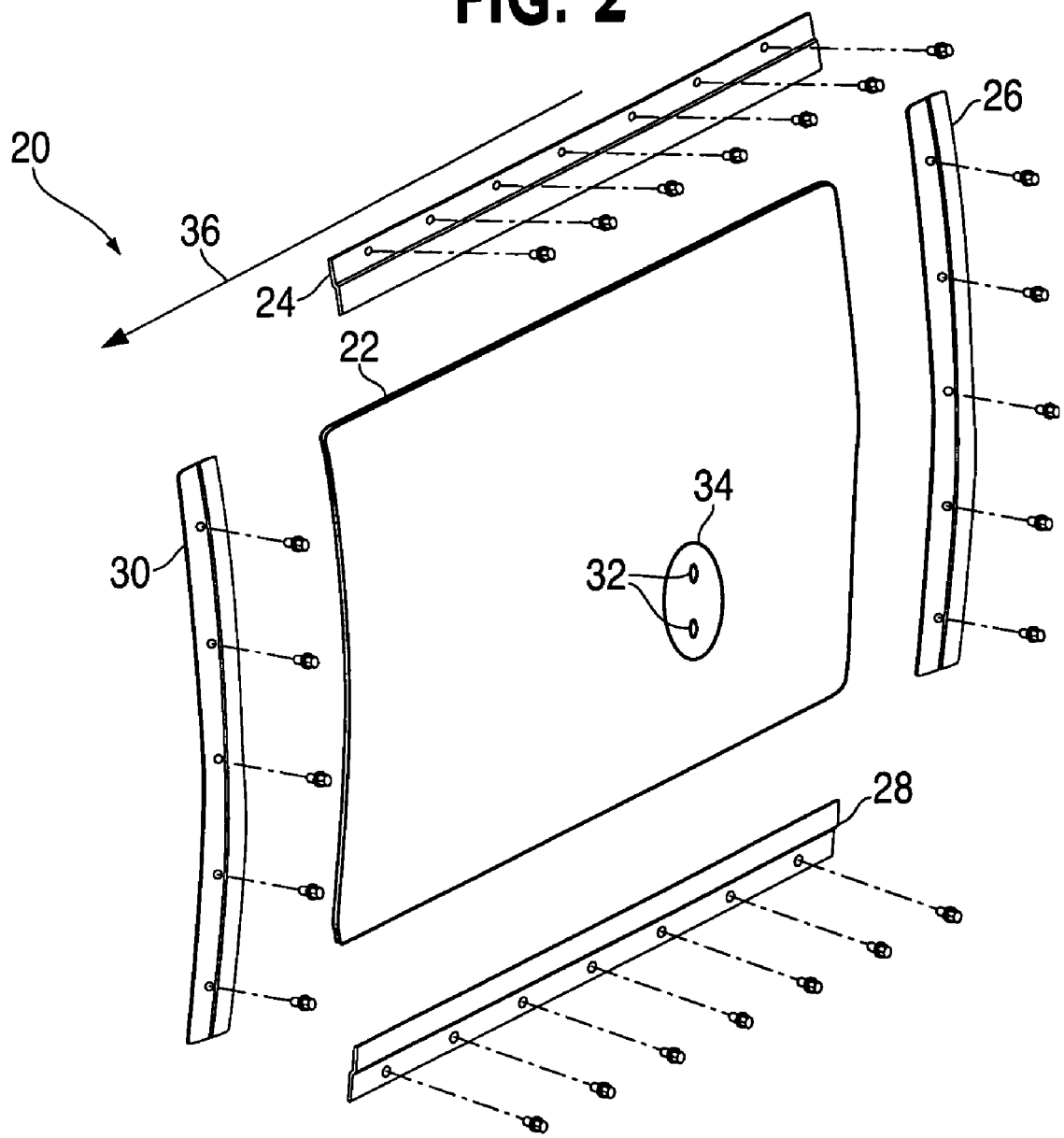
FIG. 2 is a partially exploded perspective view illustrating a static port skin appliqué with a mounting frame.

FIG. 2 is an exploded perspective diagram illustrating a static port skin appliqué configuration 20 in which a panel 22 is held by a mounting frame having first, second, third, and fourth components 24, 26, 28, and 30, respectively. Holes, referred to hereinafter as static port apertures 18, shown for passing air pressure through the panel 22, are representative; these can vary by application, and may in many embodiments follow the arrangement used by the original aircraft manufacturer. In some embodiments, the static port 12 can protrude to the surface of the panel 22, while in other embodiments, a thermally conductive insert 34 in the panel 22 can couple heat from a source within the static port 12 to control ice buildup.

FIG. 2 further illustrates a particular mounting frame 24, 26, 28, and 30 arrangement. In the arrangement shown, two frame components 24 and 28 are substantially parallel, and largely straight and aligned with the aircraft longitudinal axis 36. Third and fourth frame components 26 and 30, respectively, sit at right angles to the first pair in the embodiment shown and close the ends of a rectangle. Assembly of the panel 22 to the fuselage skin 16 for the embodiment shown uses a compound such as silicone grease, applied outside a perimeter of each static port aperture 32, preferably as a bead on both the fuselage skin 16 surface and the back side of the panel 22. Following positioning of the panel 22 against the fuselage skin 16, the mounting frame elements 24, 26, 28, and 30 can be fitted into place and attached using fastenings 40.

The panel 22 in the embodiment shown in FIG. 2 is generally rectangular, having radiused corners concealed within the frame after assembly. Other panel 22 shapes may be preferred, such as for specific fuselage contours, and may require significantly different mounting frame configurations.

The frame components of FIG. 2 are shown to have individual curved shapes as required to conform closely to a specific fuselage contour at the locations for which they are intended. For a generally cylindrical fuselage whereon is mounted a rectangular panel 22 with top and bottom edges aligned with the longitudinal axis 36, for example, frame components 24 and 28 can be substantially straight, while frame components 26 and 30 have a curve equal to that of the fuselage.

Other variations can be used to meet requirements for an individual application. In other embodiments, frame components 26 and 30 can be oriented at angles other than right angles to frame components 24 and 28. Any number of the frame components can be curved to follow a panel 22 perimeter as well as to conform to the fuselage shape. Multiple frame components can be combined into smaller numbers of units. A number of frame components different from four can be combined to form a frame. The mounting frame can be configured in some embodiments so that assembly by sliding the panel 22 into place before installing a final frame component is realizable, rather than installing several or all of the frame components after placing the panel 22 into substantially a final position.

Figure 3:
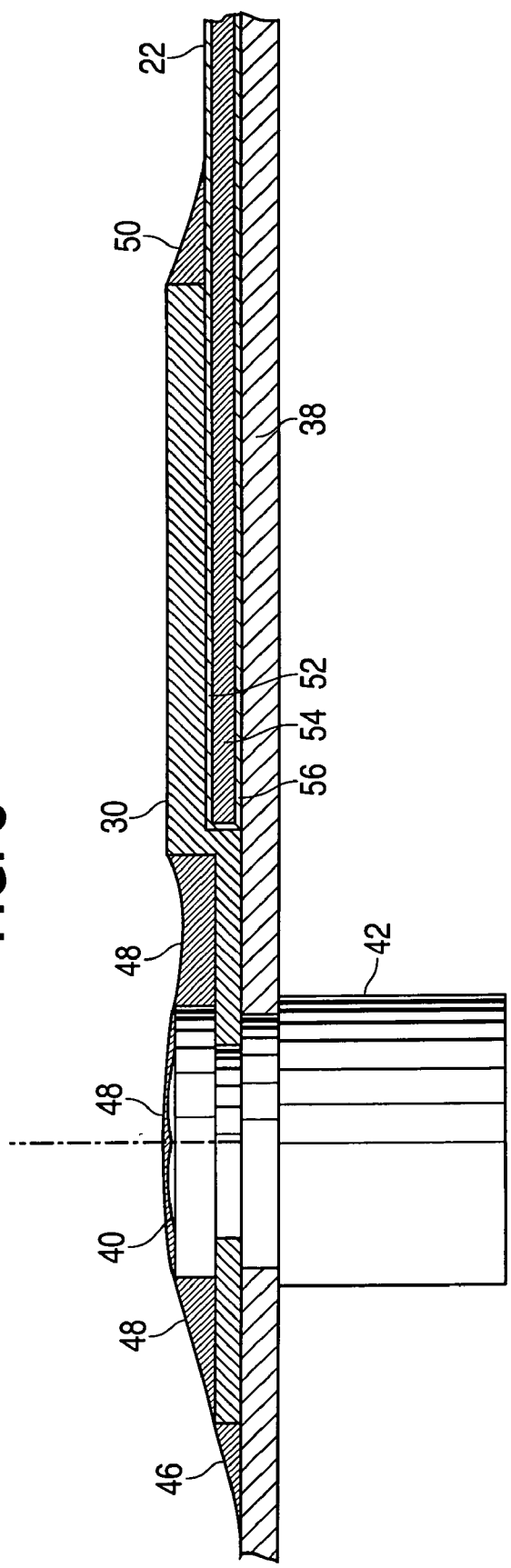
FIG. 3 is a section view of an assembly using components shown in FIG. 2.

FIG. 3 is a section view of a frame component 30 and the panel 22 held within it, positioned on a fuselage surface 38. The frame material in this embodiment is of a shape commonly referred to as a Z-bar; such a shape can be rolled or bent from flat metal stock, extruded, cast, machined, or otherwise formed. The shape can likewise be formed by molding, machining, pressure curing, or other processes from nonmetallic materials such as carbon fiber prepreg (discussed further below), fiberglass reinforced polyester, or other materials having suitable properties.

FIG. 3 shows attachment of a frame component 30 to the fuselage surface 38 using a captive fastening device such as a quarter-turn fastener 40 installed into a mating receptacle 42. This fastening method is one of many, such as riveting, welding, gluing, bolting, and the like, any of which may be suitable for individual embodiments. Specific considerations in choosing fastening methods may include frame component removability, prevention of air leaks, self-locking of fasteners, floating of receptacles, and the like, so that sealable quarter-turn fastening receptacles, sealable, self-locking threaded inserts, and like fastening systems may be preferred in some embodiments. Self-sealing rivets and similar systems may likewise be preferred in some embodiments, while installation to a nonpressurized part of an aircraft may obviate sealing as a desirable characteristic. Combining multiple fastening systems in an installation may likewise be preferred in some embodiments.

FIG. 3 further shows fillets 46, 48, and 50 of a suitable sealing material such as a room-temperature vulcanizing (RTV) silicone sealant. The fillet 46 provides an air and water barrier between the frame component 30 and the fuselage surface 38, while the fillet 48 seals over the fastener 40 and the frame component 30, and the fillet 50 seals between the frame component 30 and the panel 22. All three fillets provide fairing over surface transitions in the assembly of the fuselage surface 38, frame component 30, fastening device 40, and panel 22.

In many embodiments, a requirement exists that airflow be generally laminar in the vicinity of the static port apertures 32, shown in FIG. 2. Protrusions, such as the forwardmost frame component 30 and the leading edge of the panel 22, along with the fillets 46, 48, and 50 and fastening device 40 shown in FIG. 3, can generate a local region of turbulence, but positioning of the static port 12, shown in FIG. 1, at a sufficient distance back from a forwardmost edge of the panel 22 can permit reestablishment of a stable boundary layer, so that laminar flow is achieved over the static port apertures 32, shown in FIG. 2, for all flight regimes. The extent of disruption-free surface required aft of the static port apertures 32 to maintain laminar flow is largely negligible in many embodiments, in which instances considerations such as mechanical retention of components may dictate trailing-edge layout.

FIG. 3 further shows the layered materials of the panel 22. An outermost layer is a first fiberglass layer 52 in the form of cloth, chopped fiber, or the like, serving as a reinforcing filler for a molding compound such as polyester, acrylic, or epoxy in a neutral color, which molding compound can accept a finish to match a customer's aircraft. A next layer 54 is carbon fiber, typically woven, and preimpregnated with a thermally cured epoxy ("prepreg"). Materials of this class generally exhibit significant mechanical strength and stiffness, while generally calling for processes such as a combination of vacuum, mechanical pressure, and heat in a mold to cause the epoxy to cure into a thermoset whole. A next layer 56 is a second fiberglass layer, substantially like the first such layer 52. The fiberglass layers 52 and 56, respectively, can achieve high surface smoothness, can readily accept finish coatings, and can function as veil plies—in effect, insulators to prevent direct contact between a highly galvanic carbon fiber layer 54 and a metallic fuselage surface 38. The fiberglass and carbon fiber layers can be cured together in a single operation, or can be cured in sequence, as appropriate. Alternative materials of a class known to those knowledgeable in the art as engineering plastics are likewise suitable in some applications, where engineering plastics include organic materials and blends of organic and inorganic materials exhibiting suitable combinations of chemical and other physical properties for a given application. Examples of engineering plastics that may be suitable for some static port skin appliqué applications include urethanes, polyesters, polycarbonates, polyetherketones, and the like, with or without filler materials such as glass fibers and carbon fibers. Fiber materials other than glass and carbon may likewise be suitable, such as aramid, extended chain polyethylene, and the like.

Figure 4:
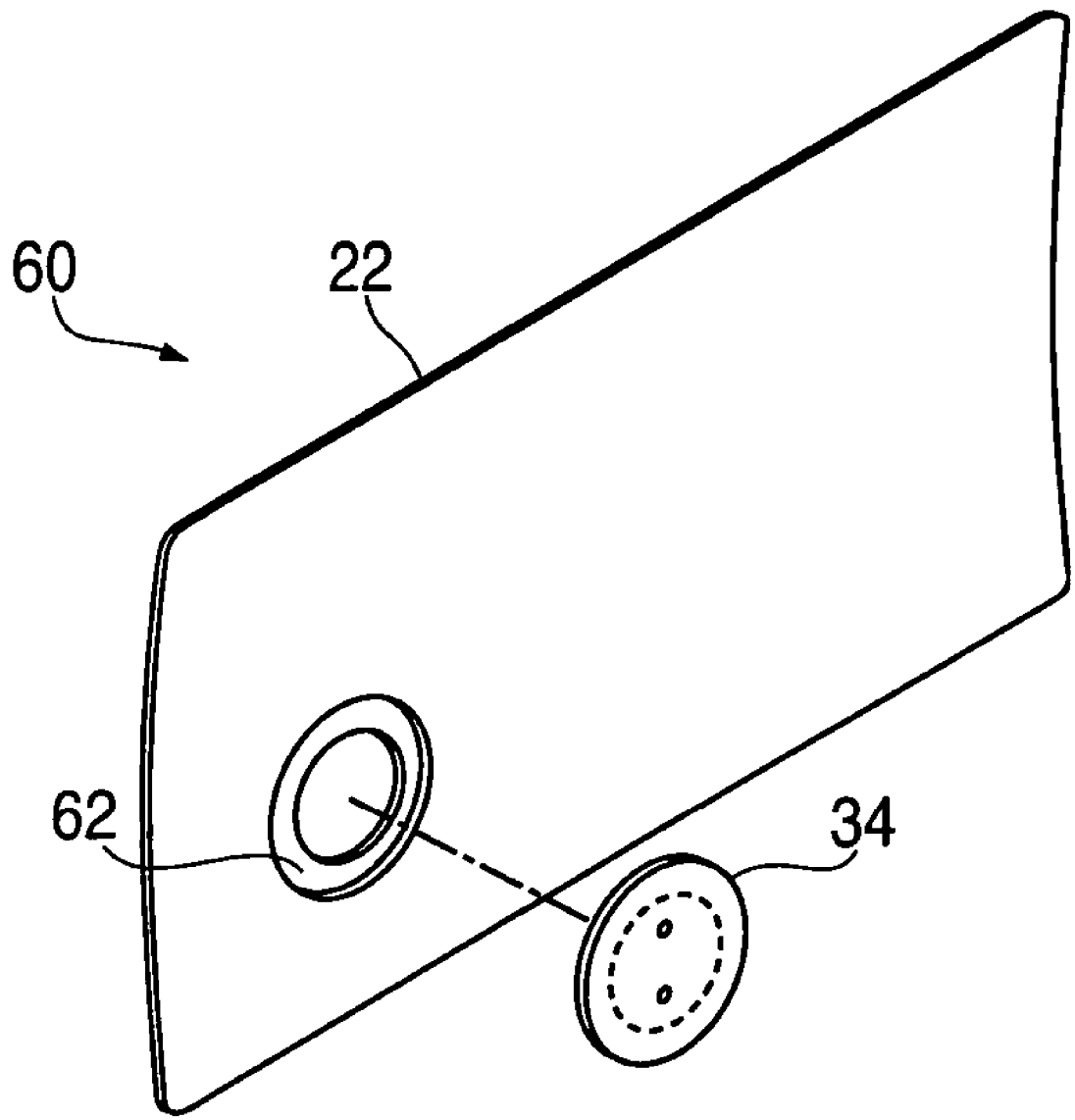
FIG. 4 is an exploded perspective view of a panel and insert from another viewpoint.

FIG. 4 is a perspective view 60 showing the inner surface of a panel 22 embodiment with an aluminum insert 34 exploded from the recessed area 62 in which the insert 34 is bonded to the panel 22. In some embodiments, the insert 34 provides thermal coupling from the underlying and heated static port 12, shown in FIG. 1, in order to prevent ice accumulation and blockage of the holes 32. Such a thermal coupling can be enhanced using a sealing and thermally conductive medium such as a silicone grease applied proximal to the holes 32 during assembly of the panel 22 to the fuselage skin 16, shown in FIG. 1.

Multiple embodiments can use the panel 22 structure shown in FIG. 4. In addition to the filleted assembly of FIG. 3, a mounting frame can be formed, such as by molding, extrusion, machining, and the like, into a faired profile. The extent of fairing of a configuration can be enhanced by forming an offset or reduced rim around the panel 22, so that the combination causes less airflow disturbance than the configuration of FIG. 3. Sealing of the frame and panel 22 to the fuselage skin 16 and to each other using aircraft-grade sealant materials is nonetheless desirable for many embodiments.

A second mounting arrangement, wherein a panel 22 similar to that of FIG. 2 is bonded directly to the fuselage skin 16 using an adhesive. The adhesive is in some embodiments gap filling and heat activated, so that application of combined heat and pressure over the surface of the panel 22 can provide a uniform and robust bond between the panel 22 and the underlying fuselage skin 16. In other embodiments, adhesives such as contact cements, in which adhesive is applied to each surface and allowed to dry before pressing the surfaces together, may be preferable. Fuselage skin 16 surface preparation techniques such as removal of waxes and oxidation products, application of bonding promoter chemicals, and other processes can improve adhesion in some embodiments. Adhesive materials that are chemically activated or that combine heat and chemical activation may be preferable in some embodiments. Adhesive materials that allow subsequent removal of the panel 22 by application of solvents or debonding agents may likewise be preferable in some embodiments.

In yet another embodiment, the panel 22 can be fabricated by pressing, rolling, or other suitable process from metallic material, such as a single layer of aircraft aluminum alloy, a metallic laminate, or the like, or from composites of metallic and nonmetallic materials. Finishing processes for such panels 22 are in many instances substantially identical to those used for finishing aircraft fuselage skin 16 surfaces.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A static port skin appliqué for an aircraft measurement reference, comprising:
   a panel configured to overlay and to be substantially conformal to a fuselage surface at a location;
   a retainer configured to secure the panel against the fuselage surface at the location;

an aperture in the panel, configured to couple air to a corresponding aperture in a static port inboard of the panel;

a hole pattern through the panel in a direction perpendicular to an external surface of the static port, wherein the hole pattern has dimensions parallel to the external surface of the static port substantially equal to dimensions of a hole pattern in the static port; and a thermally conductive insert fitted into the panel, wherein, exclusive of holes of the hole pattern, the combined thickness of the insert and panel at each point covered at least in part by the insert is substantially equal to the thickness of the panel away from the insert, wherein the insert contacts, aligns with, has a surface area comparable to a surface area of, and has a contour approximately equal to a contour of, the static port, and wherein the insert includes the hole pattern.

2. The static port skin appliqué of claim 1, wherein panel surface contours substantially duplicate fuselage surface contours at the location, and wherein panel airflow properties substantially duplicate fuselage surface airflow properties proximal to the aperture.

3. The static port skin appliqué of claim 1, wherein the retainer further comprises:
a mounting frame configured to secure a perimeter of the panel to the fuselage surface;
a faired preparation for the mounting frame, whereby airflow proximal to the aperture has low turbulence; and
a fastening provision, whereby attachment of the mounting frame and retention of the panel to an aircraft withstand a full range of flight stresses.

4. The static port skin appliqué of claim 3, wherein the faired preparation for the mounting frame further comprises:
application of an adhesive sealant material, whereby access of airflow and penetration of water and other contaminants between at least one component of the static port skin appliqué and the fuselage surface is substantially prevented; and
application of a sealant grease material, whereby access of airflow and penetration of water and other contaminants between the aperture in the panel and any portion of the fuselage other than the corresponding aperture in the static port is substantially prevented.

5. The static port skin appliqué of claim 4, wherein sealant grease occupying an interstitial volume between the thermally conductive insert and the static port, proximal to the hole pattern therethrough, is thermally conductive.

6. The static port skin appliqué of claim 3, wherein the mounting frame further comprises a plurality of frame elements, each generally conformal to and overlaying at least a portion of a boundary edge of the panel with a panel retention part of each frame element, and generally conformal to a fuselage surface on a mounting part of each frame element distal to the panel retention part thereof.

7. The static port skin appliqué of claim 6, wherein a z-bar portion of the frame is overlaid at least in part with adhesive sealant.

8. The static port skin appliqué of claim 6, wherein a transition from the panel retention part of a frame element to the panel comprises adhesive sealant.

9. The static port skin appliqué of claim 1, wherein the panel further comprises:
a panel material having structural properties comparable in at least one of resilience and hardness to a fuselage surface material;
a panel material having thermal and dimensional isomorphic properties compatible with closely fitting the panel to the fuselage surface; and
a material coating on an exterior surface of the panel compatible with conventional aircraft finishing and finish maintenance methods.

10. The static port skin appliqué of claim 9, wherein the panel further comprises:
a molding compound, wherein the molding compound comprises any one of polyester, acrylic, urethane, polycarbonate, polyetherketone, and epoxy;
an outer-layer reinforcing filler, wherein the outer-layer reinforcing filler is fiberglass, aramid, or extended chain polyethylene; and
an inner-layer reinforcing filler, wherein the inner-layer reinforcing filler is carbon fiber.

11. The static port skin appliqué of claim 9, wherein the panel further comprises a metallic material, wherein the metallic material comprises any one of a single layer of aircraft aluminum alloy, a metallic laminate, and a composite of metallic and nonmetallic materials.

12. The static port skin appliqué of claim 9, wherein a finishing process applied thereto is substantially identical to an aircraft fuselage skin surface finishing process.

13. The static port skin appliqué of claim 1, wherein the retainer further comprises at least one of:
an adhesive material, whereby the panel is secured to the fuselage surface;
an adhesive material substantially equivalent in application methodology to a contact cement;
an adhesive material activated by heating;
an adhesive material, a bond of which to a fuselage surface is subject to release by a solvent; and
an adhesive material having gap filling capability, whereby bonding between the panel and the fuselage surface takes place with low occurrence of unjoined regions.

14. The static port skin appliqué of claim 1, wherein the retainer further comprises an adhesive material, and wherein the panel is configured to be attached to the fuselage surface by an adhesive layer.

15. The static port skin appliqué of claim 14, wherein the adhesive material is applied to each of the surfaces to be joined and allowed to dry before pressing them together.

16. The static port skin appliqué of claim 14, wherein the adhesive material is subject to activation by a process, wherein the process comprises at least one of heating and pressure.

17. The static port skin appliqué of claim 14, wherein the adhesive material is characterized by gap filling capability sufficient to establish uniform bonding between at least a portion of the panel and the fuselage surface.

18. The static port skin appliqué of claim 14, wherein a bond between the panel and the fuselage surface is subject to release by an agent, wherein the agent comprises any one of a solvent and a debonding agent.

19. The static port skin appliqué of claim 1, wherein the hole pattern comprising the panel aperture substantially aligns with the hole pattern in the static port.

20. The static port skin appliqué of claim 1, wherein removal and replacement of the appliqué corrects airflow distortion effects associated with impact or scratch events at least at some levels of severity thereof.

* * * * *